United States Patent [19]

Easton

[11] Patent Number: 5,451,136
[45] Date of Patent: Sep. 19, 1995

[54] AUTOMATIC DEPALLETIZER

[75] Inventor: Richard L. Easton, St. Peters, Mo.

[73] Assignee: Alvey, Inc., St. Louis, Mo.

[21] Appl. No.: 249,291

[22] Filed: May 26, 1994

[51] Int. Cl.⁶ .......................... B65G 59/08; B65H 3/24
[52] U.S. Cl. .................. 414/795.8; 414/786; 414/796.2; 414/796.5; 414/796.8
[58] Field of Search ............... 414/795.8, 796.2, 797.5, 414/796.7, 796.8, 786

[56] References Cited

U.S. PATENT DOCUMENTS

| | | | |
|---|---|---|---|
| 2,254,550 | 9/1941 | Stevenson | 414/795.8 |
| 2,701,064 | 2/1955 | Byington | 414/795.8 |
| 3,327,872 | 6/1967 | Madden | 414/796.8 |
| 3,521,763 | 7/1970 | Heide et al. | 414/795.8 |
| 3,616,951 | 11/1971 | Mueller et al. | 414/795.8 |
| 4,106,635 | 8/1978 | Nishimura | 214/8.5 |
| 4,710,089 | 12/1987 | Schneider | 414/118 |
| 4,776,742 | 10/1988 | Felder | 414/118 |
| 4,802,810 | 2/1989 | Gunn | 414/414 |

Primary Examiner—Michael S. Huppert
Assistant Examiner—Douglas A. Hess
Attorney, Agent, or Firm—Varnum, Riddering, Schmidt & Howlett

[57] ABSTRACT

A material handling system includes a depalletizer comprising a tower frame and a tilt bed which extends into the tower frame and is tilted to a predetermined angle. A lift bed raises a loaded pallet to the level of an exit conveyor. A back dam is disposed opposite the exit conveyor and is movably mounted to the frame to exert a force against a layer of articles to be removed. A collector roller is mounted to the tower frame and moves between a position adjacent the exit conveyor and a position adjacent the back dam to assist in the removal of any articles remaining after the force has been applied by the back dam.

26 Claims, 13 Drawing Sheets

AUTOMATIC DEPALLETIZER

BACKGROUND OF THE INVENTION

1. Field of the Invention

This invention relates to material handling systems and more particularly to an automated depalletizer for use in a material handling system.

2. Description of Related Art

Material handling systems are commonly used to move materials in warehouses and the like, preferably with a minimum of human labor. In a typical warehousing operation, pallets loaded with articles, or units, such as cartons or other loaded containers are transported to a warehouse or distribution center. There, the goods are depalletized, i.e., removed from the pallets, and stored in the warehouse or directed elsewhere for further distribution. The depalletizing operation is performed primarily by human labor. It is, therefore, a relatively expensive and time consuming operation. It is also an operation which leads to injuries since the individual units to be handled may weigh on the order of 60 lbs. or more and a great deal of reaching is often required. Attempts have been made to automate the unloading of pallets. A complication, however, in automatic depalletizing is that the units loaded on the pallets are often not of uniform dimensions and a variety of sizes and shapes of units must be accommodated. Also, the units must be handled with sufficient care to avoid damage. Furthermore, the orientation of the units as they are unloaded from the pallets onto a conveyor or the like may have to be controlled. Particularly in cases where a certain side of the unit must be read by a bar code reader or the like.

One known depalletizer is disclosed in U.S. Pat. No. 4,106,635 entitled Elevatable Depalletizing System. That system includes a lift table, supported on a tiltable mast, used to raise the loaded pallet to the level of a chute. The tiltable mast is tilted until the articles of the uppermost layer begin to slide off. The chute includes a stopper mechanism which allows only one row of a layer of articles to slide off at a time. A problem with this prior art arrangement is that it relies on the angle of tilt of the mast to remove the individual units from the pallet. While that may be effective for certain goods, it will tend to cause units with a relatively small base, compared to its height, to topple. That may cause damage, but will also change the orientation of the unit in an unacceptable way. The chute mechanism allowing only one row to be removed at one time adds delay and reduces system throughput.

SUMMARY OF THE INVENTION

These and other problems of the prior art are overcome in accordance with this invention by an automated depalletizer with a lift bed and a tilt bed, which is not tilted beyond a predefined angle, and further provided with means to assist the removal of units from the pallets. In accordance with one aspect of the invention, a collector roller, mounted between opposed collector roller drives, is provided to move any units of a layer which are not otherwise removed at the predetermined tilt of the tilt bed, in a discharge direction. Advantageously, the collector roller of this invention assists in the unloading of units of a variety of weights and shapes. In one embodiment of the invention, the depalletizer includes a frame and the collector roller drives are mounted to opposed sides of the frame and extend substantially perpendicular to the tilt bed when the tilt bed is in the tilted position. The collector roller drives are operable to move the collector roller between the collector drives as the collector roller is rotated by means of a power drive mounted thereto. A sheet of relatively low friction material may be operably mounted to the collector roller drives such that the sheet moves with the collector roller and advantageously provides a low friction surface for the sliding removal of units from the pallet.

In accordance with another aspect of the invention, the depalletizer comprises a movable back dam which is operative to apply a pushing force to a layer of units to be removed in the direction of unloading. In one particular embodiment of the invention, the lift bed is lowered by a selected distance prior to operation of the collector roller and the back dam is movable between an upper and a lower forcing position to apply a force against units on a pallet in both the upper and the lower pallet unloading position.

In accordance with another aspect of the invention, the depalletizer includes a control unit and a plurality of sensors and the control unit controls the raising of the lifting bed until at least one unit of an uppermost layer begins to break away. A detection arrangement is provided that indicates when a layer has been partially unloaded and a control unit activates the collector roller to cause removal of remaining units. A further detection arrangement comprising an indication of the distance between the lower surface of a layer and the plane of travel of the collector roller. The control unit is operative to lower the pallet by a distance corresponding to the detected distance prior to activating the collector roller to cause removal of the remaining units in the layer. In a particular embodiment of the invention, the collector roller is driven by a reversible motor.

In accordance with another aspect of the invention, a base for positioning pallets prior to being lifted by the tilt/lift module includes a shuttle which moves pallets laterally to a position adjacent to the back wall of the tilt/lift module.

BRIEF DESCRIPTION OF THE DRAWING

An embodiment of the invention is described below with reference to the drawing wherein.

DETAILED DESCRIPTION

Figure 1:
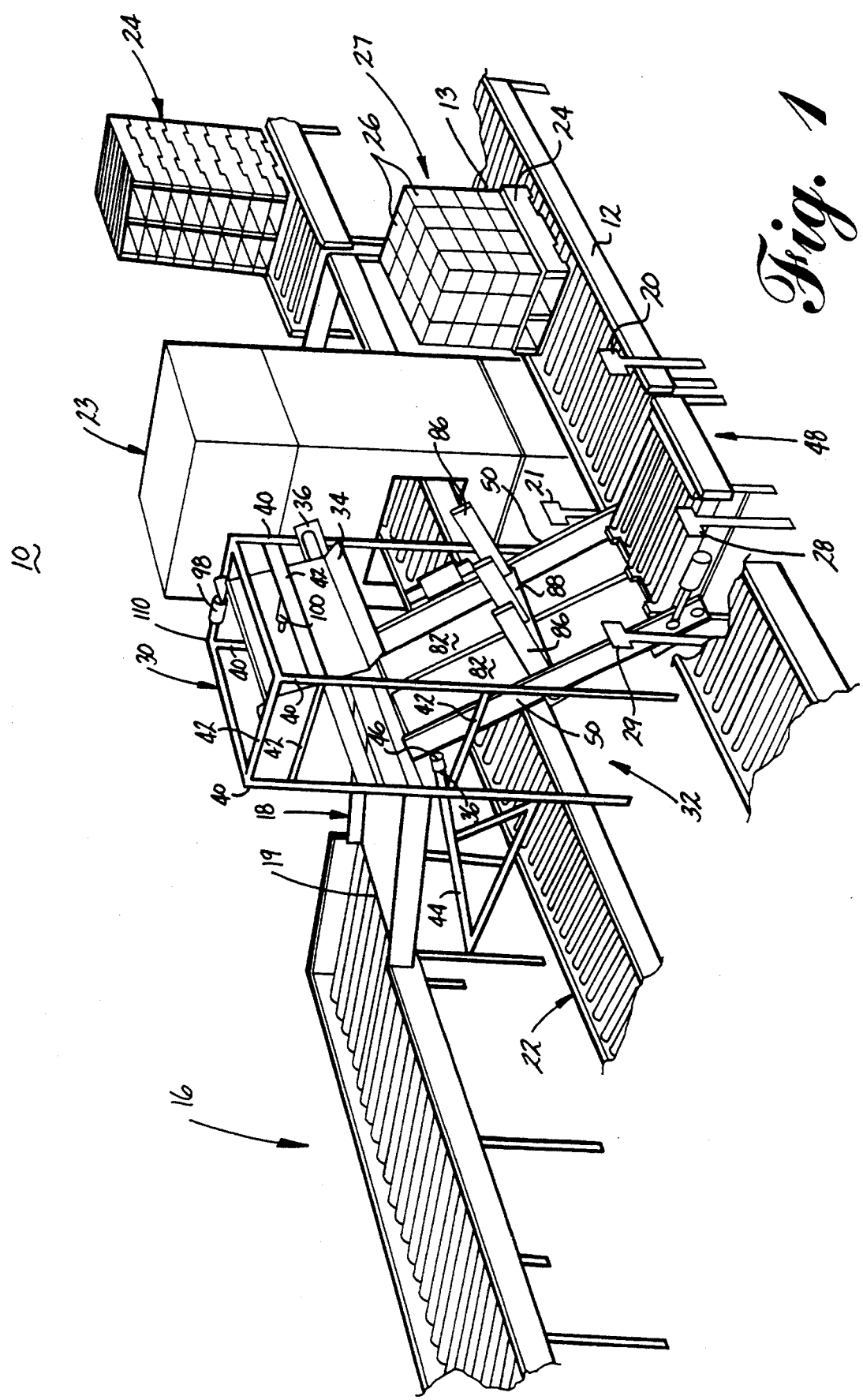
FIG. 1 is a perspective representation of a material handling system including an automatic depalletizer incorporating principles of the invention.

FIG. 1 depicts a material handling system 10 including a depalletizer 14 comprising a tower frame 30 provided with corner posts 40 and cross members 42. A tilt/lift module 32 is partially disposed within the tower frame 30 and includes a tilt bed 50 and a lifting bed 88. A pallet 24 stacked with a plurality of units 26, i.e., cartons or other units, is moved toward the tilt lift module 32 by means of a standard accumulator conveyor 12. The pallet is moved onto a base 48 after the tilt bed 50 has been brought to the upright position and the lift bed 88 has been lowered to a position wherein the tines 86 of the lift bed 88 are positioned below the upper surface of the base 48. The base 48 is provided with a shuttle mechanism which moves the loaded pallet 24 laterally in the direction of the tilt bed and immediately adjacent against back wall panels 82 of tilt bed 50. Thereafter, the tilt bed 50 is tilted into the area defined by the tower frame 30 until it rests against stops 46 on support members 44. The loaded pallet is lifted on the tines 86 to a level wherein the upper layer 27 of the pallet 24 reaches a desired level. The height to which the loaded pallet 24 is raised by the lift bed 88 is determined by the height of the exit conveyor, which in this particular implementation is a metering belt 18. The metering belt 18 is a well-known device operating at a fixed speed to transfer the units to well-known unscrambler conveyor 16 which causes the units to be aligned and transported to any desired location. A kicker roller 19, operating at a relatively high speed is mounted between the metering belt 18 and the unscrambler conveyor 16. It separates the row of layer 27 and directs the units toward one side of the conveyor 16. When the top portion of the upper layer of a pallet to be unloaded reaches a selected height within the tower, a back dam assembly 34 begins to exert force against the upper layer. When the upper layer has reached a point above the level of the metering belt 18, units of the upper layer will normally begin to move in the direction of the metering belt 18 and upward movement of the lifting bed 88 will be stopped.

Optical sensing devices provide an indication as to whether the upper layer has been completely removed from the pallet onto the metering belt 18. If the upper layer has not been fully cleared, the lifting bed 88 will be lowered by a distance sufficient to allow a collector roller, mounted to the collector roller drive assembly 36, to be moved along the layer in the direction of the back dam. The collector roller cooperates with the back dam assembly 34 to cause the units to be removed. Each time after a layer has been removed, the lift bed 88 is automatically moved up to discharge the next layer onto the metering belt 18. After all layers of a pallet have been unloaded, the pallet is lowered and again placed on the base 48. Operation of the shuttle unit of the base 48 causes the empty pallet to be aligned with an output conveyor 22 by which the empty pallets are transferred to a well known conveyor stacker 23 and arranged for further shipment.

The base 48 comprises powered rollers used in moving a loaded pallet in proper alignment with respect to the tilt/lift module 32. Electro-optical devices 20,21 and 28, 29 provide an indication to the system's controller (not shown in FIG. 1) whether a loaded pallet is ready to be moved on to the base 48 from the accumulator conveyor 12 and whether an empty pallet may be moved onto the exit conveyor 22.

Figure 2:
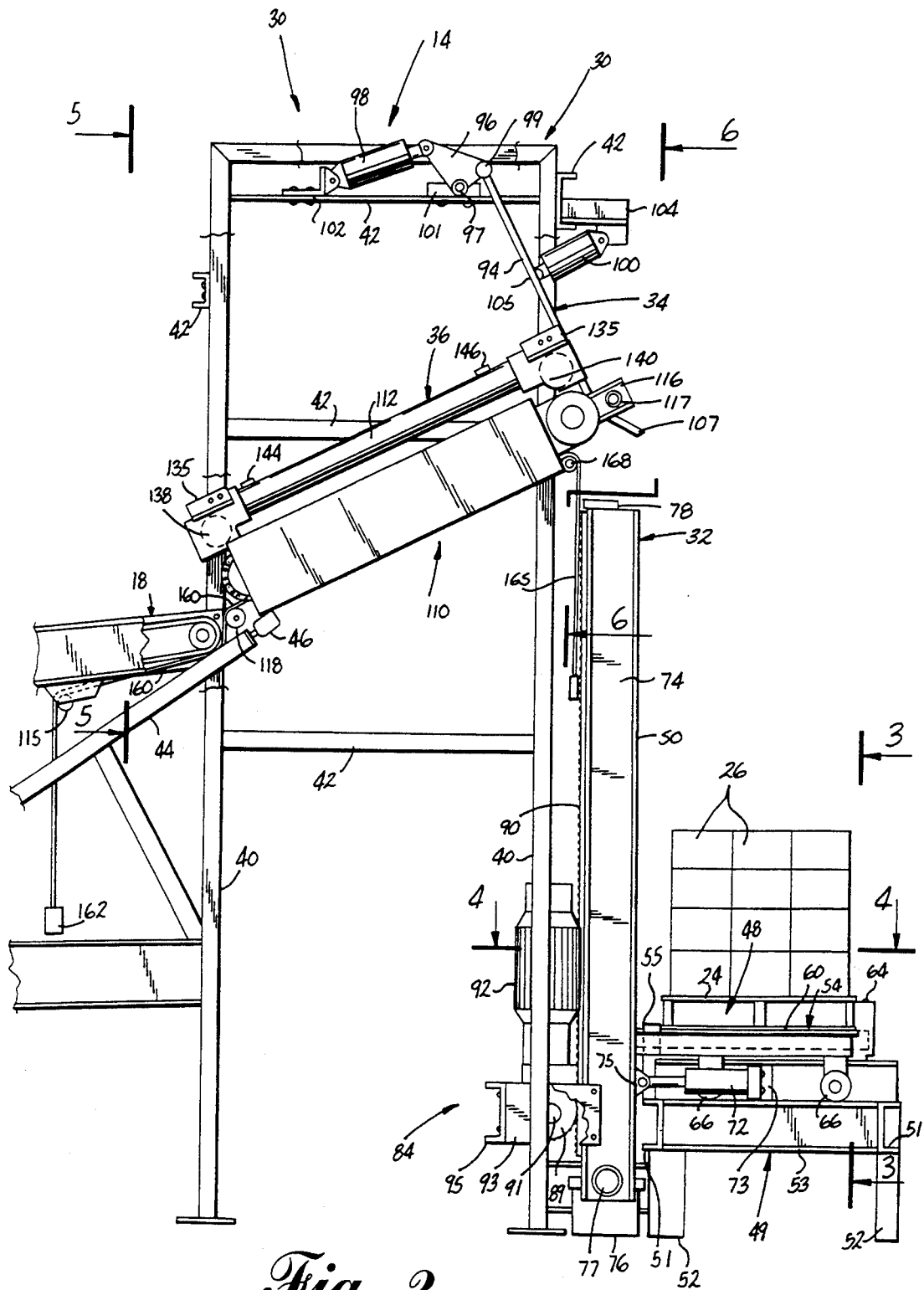
FIG. 2 is a side elevational view of the automatic depalletizer of FIG. 1.
Figure 3:
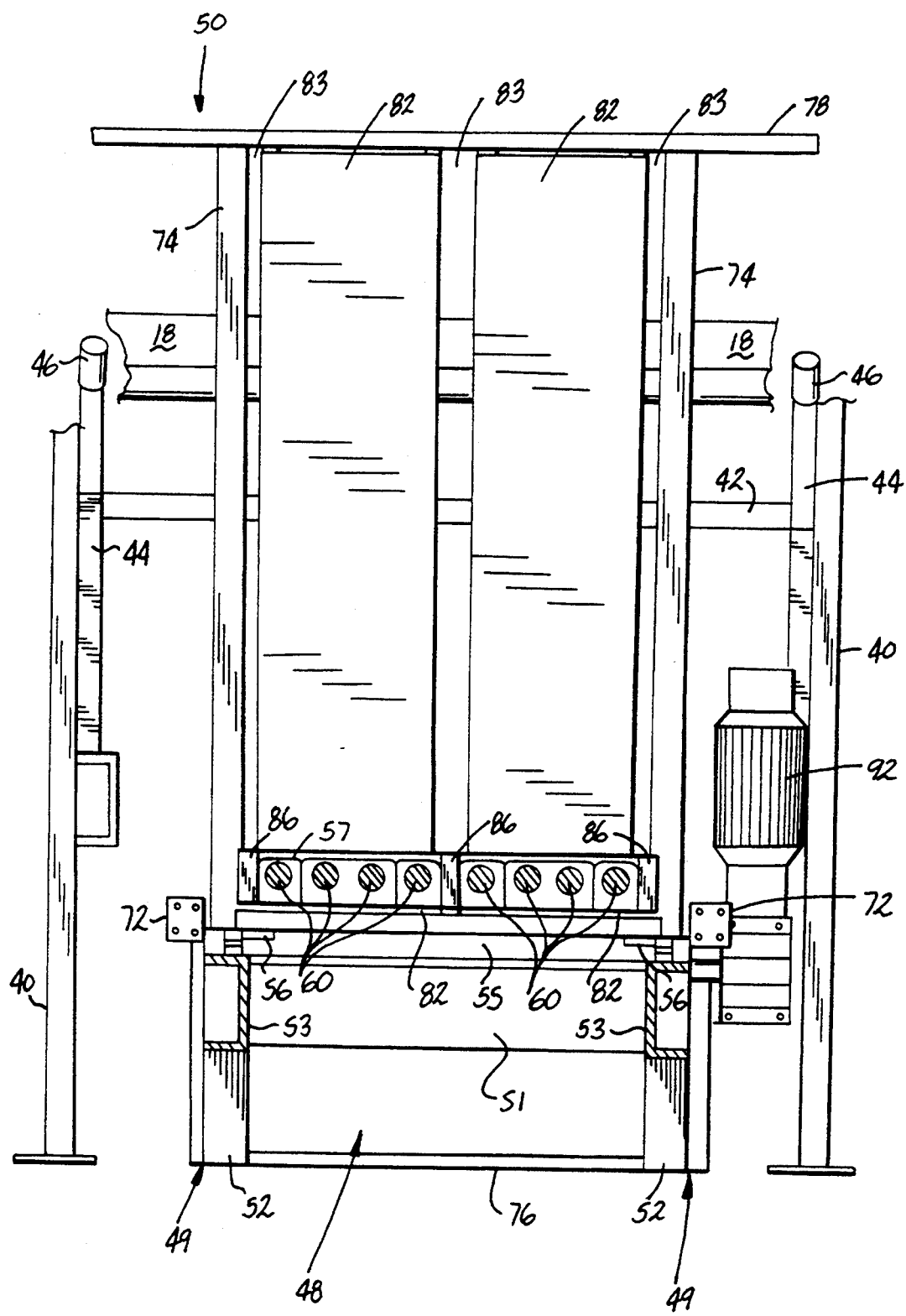
FIG. 3 is a partial sectional view taken along line 3—3 of FIG. 2.
Figure 4:
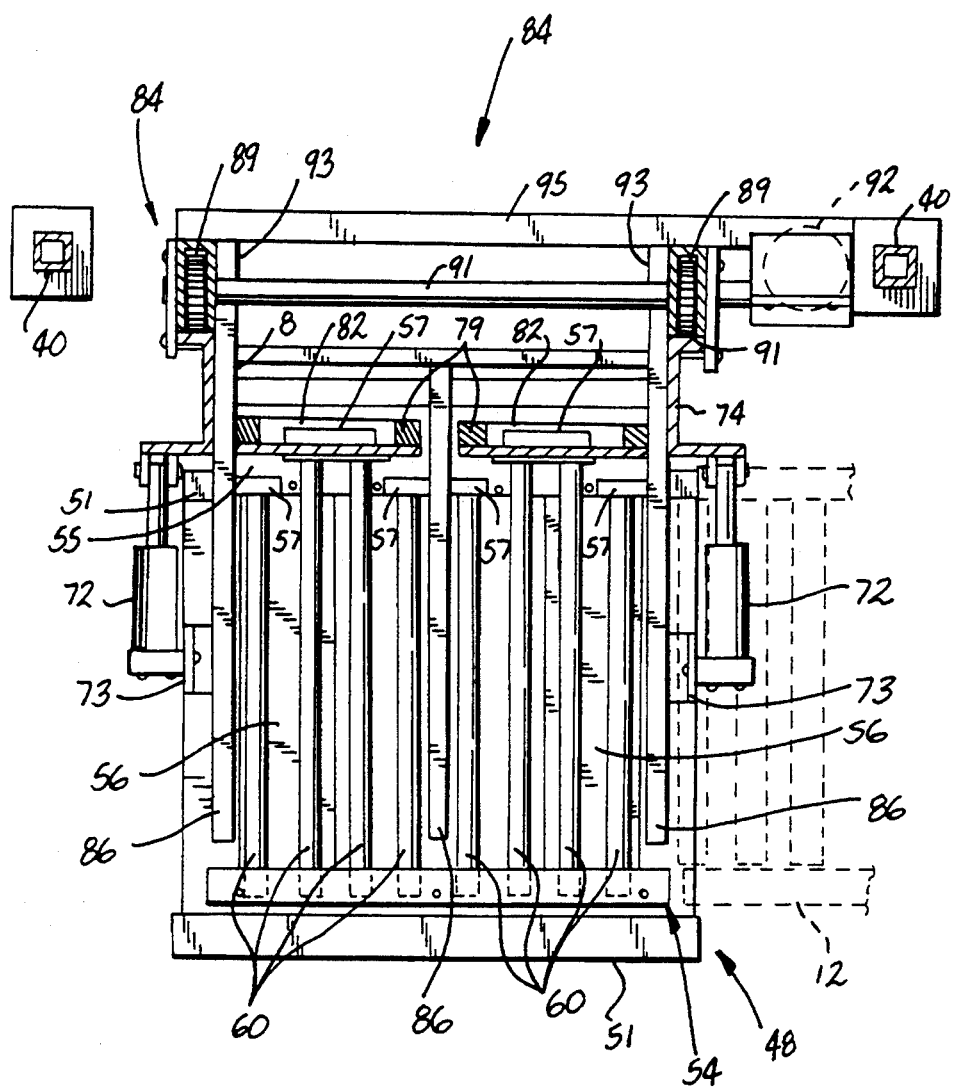
FIG. 4 is a partial sectional view taken along line 4—4 of FIG. 2.
Figure 5:
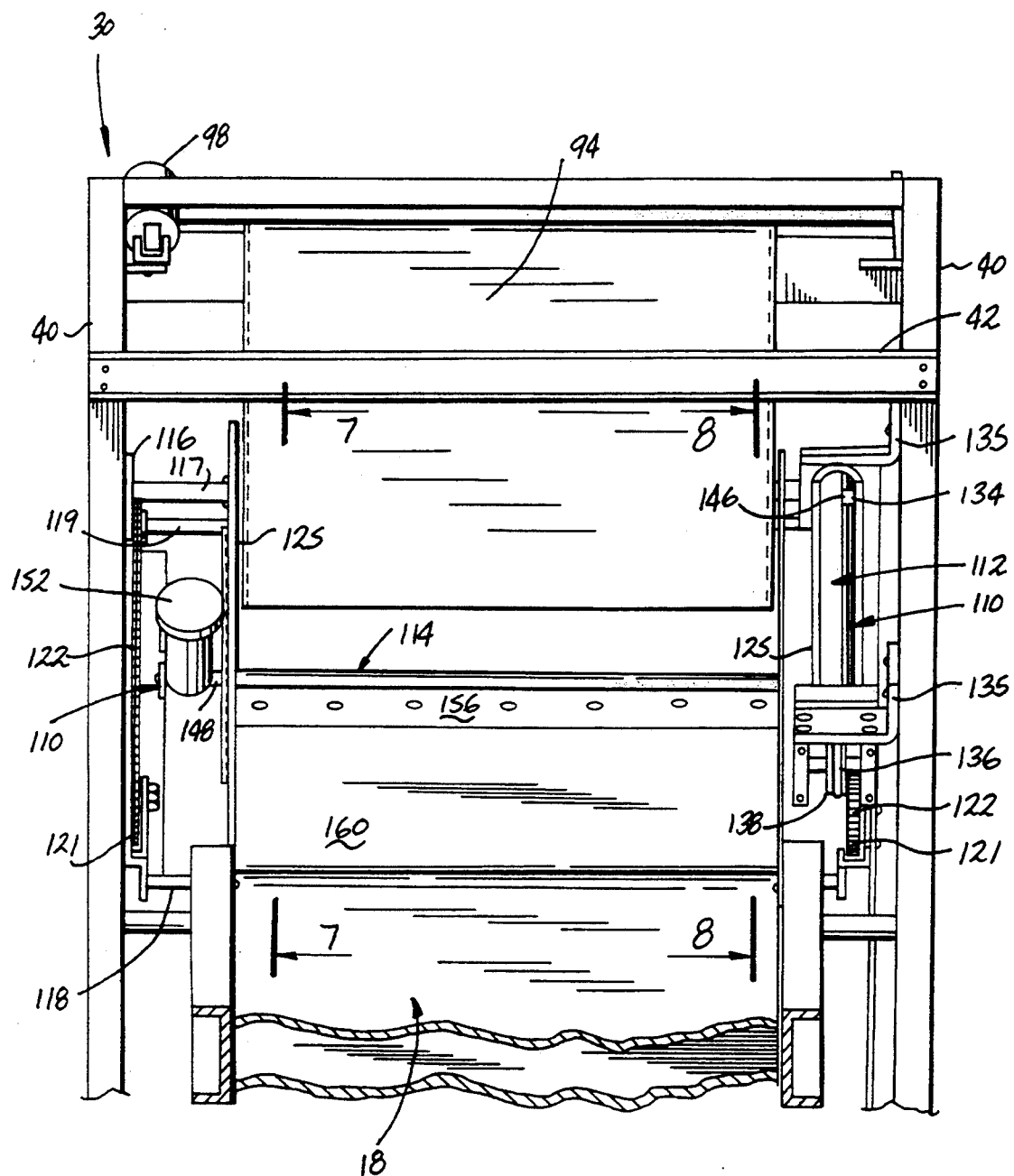
FIG. 5 is an enlarged partial frontal view of the depalletizer of FIG. 2.

As shown in FIGS. 2–4, the tilt bed 50 of the tilt/lift module 32 comprises a pair of side rails 74 rigidly connected by an upper cross member 78 and pivotally mounted to a lower cross member 76 by means of a pivot pin 77. The base 48 is generally rectangular in plan and comprises sides 49, which are connected by cross beams 51 to form a rigid base. Each of the sides 49 comprises a pair of opposed legs 52 connected by rails 53. A pair of cylinders 72 are mounted to the rails 53 by mounting members 73 and by clevis brackets 75 to the side rail 74 of the tilt bed 50. The tilt bed 50 is moved by fluid cylinders 72 between a substantially vertical position, shown in FIG. 2, and a tilted position in which the cross member 78 rests against the stops 46 of support member 44. The cylinders 72 may be hydraulic or pneumatic cylinders. The degree of tilt of the tilt bed 50 is preferably on the order of 30°.

A shuttle 54 comprising side frames 55 and 64 interconnected by cross members 56 (FIG. 3), travels on the rails 53 of base 48. Wheels 66 are mounted to the cross members 56 and rest on the rails 53 so that the shuttle can be translated laterally relative to the tilt bed 50. The shuttle 54 is selectively moved along the rails by a fluid cylinder (not shown) toward and away from tilt bed 50.

The loaded pallet 24 is lifted on the tines 86 of the lifting bed 88. A rack and pinion drive 84 is movably mounted to the tilt bed 50 and comprises racks 90, mounted to each of the side rails 74, and pinion gears 89 connected by a drive shaft 91 and powered by an electric motor 92. The drive shaft 91 is journaled in support plates 93. A beam 95 is connected to the plates 93 and mounts the electric motor 92. The motor 92 drives the drive shaft 91 in a conventional fashion, which causes the pinion gears 89 engaging the racks 90 to be turned, thereby raising the lifting bed 84 to a raised position adjacent the carton metering belt 18 for removal of the units 26.

Powered rollers 60 in the base 48 are driven by a conventional drive mechanism within the side frame 64. The rollers 60 are journaled at the non-driven end in upstanding flanges 57 (FIG. 3) on side frame 55. Certain of the rollers 60 are longer than others. The shorter rollers are dimensioned to accommodate reinforcing support members 79 supporting the back wall panels 82. As shown in FIG. 3, the back wall panels 82 of the tilt bed 50 are spaced apart from each other and their respective adjacent side rails 74 thereby creating openings 83 which allow for the vertical movement of the tines 86. The tines 86 are adapted to be positioned in the shuttle 54 between sets of rollers 60, when the tilt bed 50 is in the vertical position and the lifture bed 88 is in the lowered position, as shown in FIG. 3.

Figure 6:
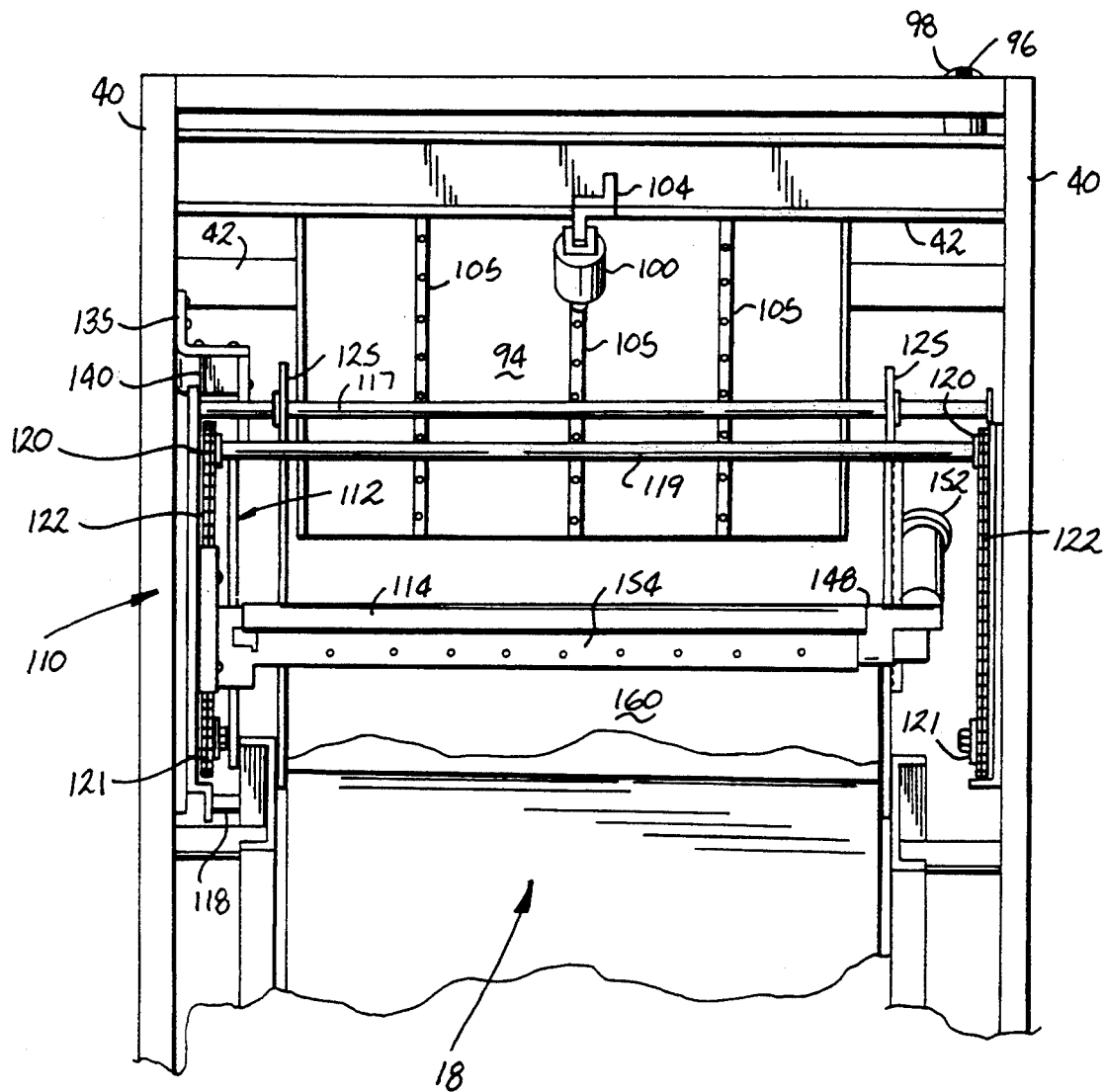
FIG. 6 is an enlarged partial rear view of the depalletizer of FIG. 1.
Figure 7:
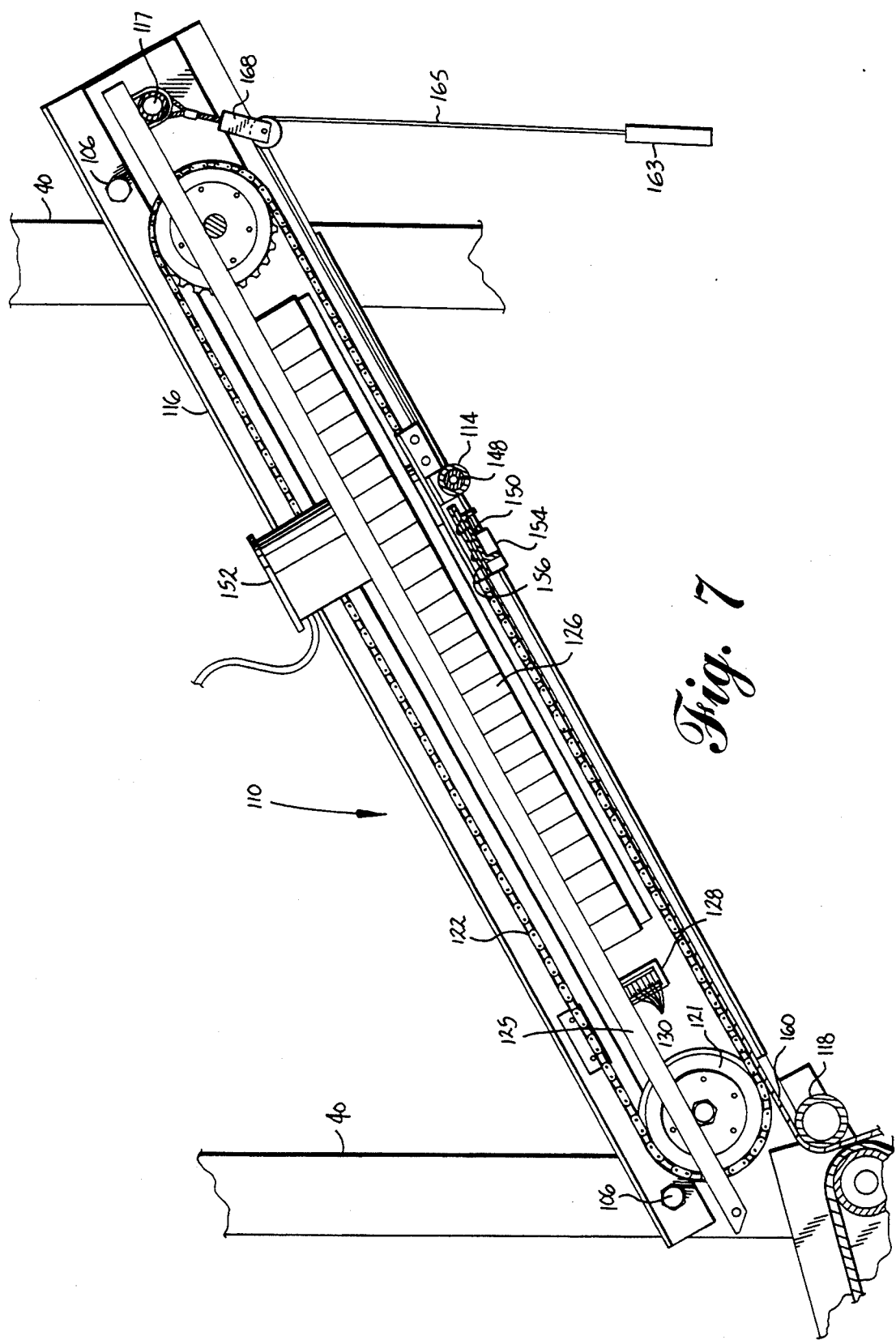
FIG. 7 is a partial sectional view along line 7—7 of FIG. 5.
Figure 8:
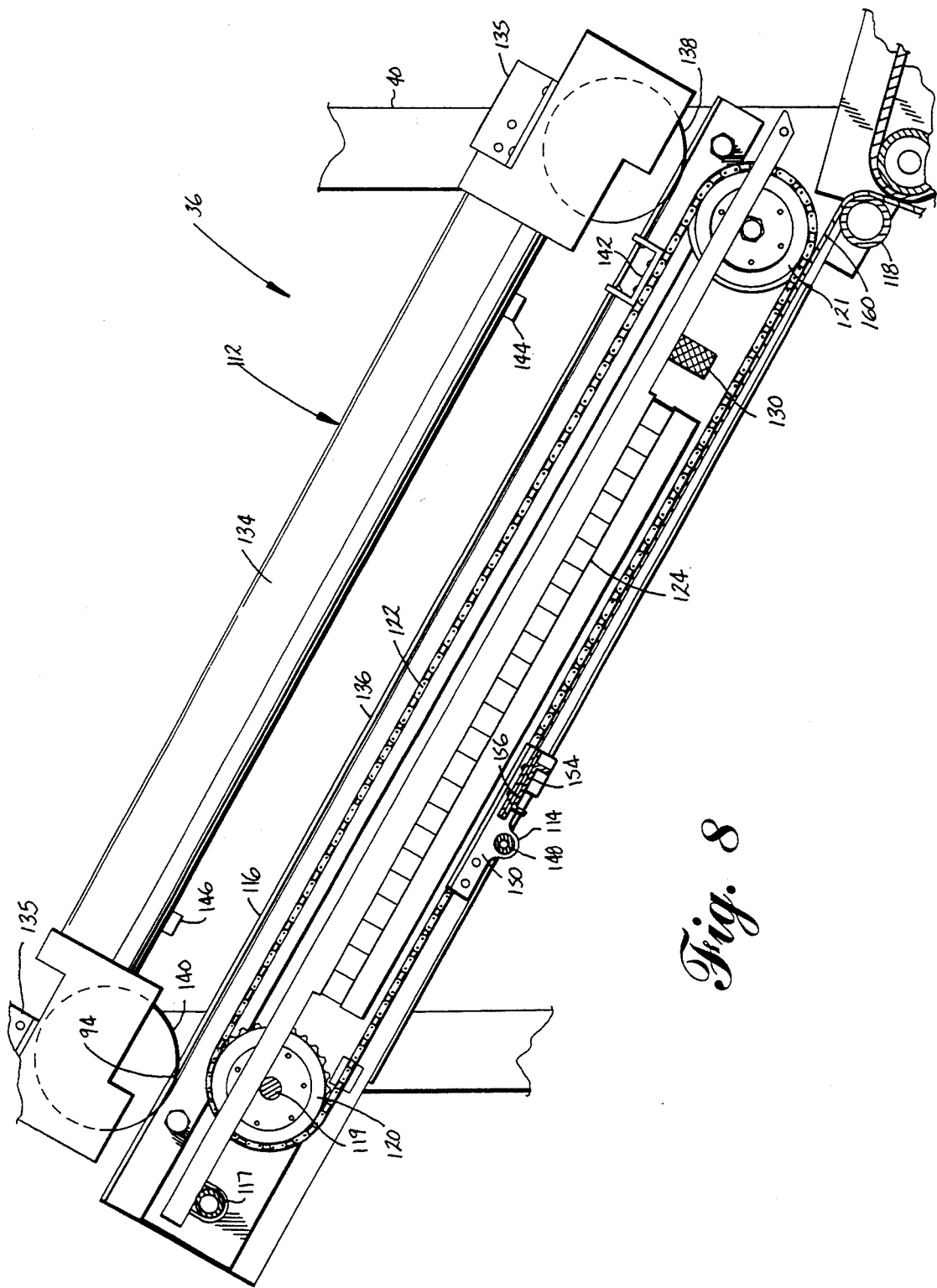
FIG. 8 is a sectional view along line 8—8 of FIG. 5.

The collector roller assembly 36 is shown in greater detail in FIGS. 2 and 5 through 8. The assembly comprises a pair of spaced collector roller drives 110 mounted inside, and to opposite sides of, the tower frame 30. A powered collector roller 114, supported on shaft 148, and a collector roller apron 160 are mounted between the drives 110. Each of the collector roller drives 110 comprises an elongated vertical plate 116 which is mounted to adjacent corner posts 40. The plates 116 are connected at their ends by support tubes 117 and 118, as depicted in FIGS. 7 and 8. An axle 119, adjacent support tube 117 is journaled in support plates 116 and mounts a sprocket 120 at each end. A set of idlers 121 are rotatably mounted to the support plates 116 adjacent the other support tube 118. An endless chain 122 is trained around each of the sets of sprockets 120 and idlers 121. A pair of guides 125 is secured at one end to support tube 117 and at the other end to the frame of the metering belt 18 and extends between two corner posts 40 to protect the chain drive and to prevent product from falling off during discharge.

The collector roller 114 is rotatably mounted on opposite ends via brackets 150 (FIG. 7, 8) to the endless chain 122. A shaft mounted, reversible electric motor 152 (FIG. 7) is mounted to the endless chain bracket 150 of the right (as viewed from the base 48) collector roller drive 110 and has an output shaft which drivingly connects to the collector roller 114. The motor 152 rotates the collector roller 114 in opposite directions under control of the system controller during the depalletizing procedure.

In the depalletizing procedure, the collector roller 114 is initially positioned adjacent support tube 118 and is rotated in a direction to assist in the movement of units of a layer toward the metering belt 18. If all units of a layer are not removed by the force of gravity, the lifting bed 88 is lowered to assure that the top of the next layer is positioned below the level of collector roller 114. The collector roller 114 is moved by means of the collector drives 110 along the top surface of the next layer to remove the remaining units, in cooperation with the back dam assembly 34. The collector roller 114 is preferably provided with a high friction outer surface to facilitate removal of cartons or other units from a pallet.

The collector apron 160 has one end clamped between an upper plate 156 and a lower plate 154 which are bolted together and rigidly mounted to the endless chain brackets 150 adjacent the collector roller 114. The collector roller apron 160 extends from the plates 156, 154 over support tube 118 in front of the carton metering belt 18 and around an idle roller 115 (FIG. 2), mounted below the carton metering belt 18, and extends downwardly therefrom. The support tube 118 may be provided with an air bearing to reduce friction. Collector roller 114 and the collector apron 160 are moved back and forth by the endless chain 122, as described later herein, along a path defined by brackets 150 on endless chain 122. The apron 160 is preferably made of a pliable material with a smooth outer surface, such as nylon, to facilitate removal of units from a pallet. To assure that the curtain remains substantially flat, a weight 162 is mounted to the free end of the apron 160. A weight 163 (shown in FIG. 2) is connected by a cable 165, extending over a pulley 168, to bracket 150 to counter balance the load on the collector roller assembly 36 due to the weight 162.

The left collector roller drive 110 (FIG. 8) mounts a fluid power operated cable cylinder 112 disposed directly above and in parallel relationship to the endless chain 122. The cable cylinder 112 is a standard device comprising a piston (not shown) disposed within the cylinder housing 134. The piston is operated by air pressure which is selectively supplied to either end of the cylinder housing 134 through conventional fittings (not shown) to move the air operated piston. The cable cylinder 112 is mounted to two of the corner posts 40 by brackets 135. The piston is connected to a cable 136 which is wrapped around rollers 138 and 140 disposed on opposite ends of the cylinder housing 134. The cable 136 is mounted to a chain bracket 142 which is connected to the endless chain 122 of the left collector roller drive 110. Thus, movement of the piston within the cylinder housing 134 results in a corresponding movement in the same direction in the upper portion of the chain 122 and a corresponding movement in the opposite direction of the lower portion of the chain 122 and of the collector roller 114 and the collector apron 160. Electromagnetic proximity switches 144 and 146, disposed near opposite ends of the cable cylinder 112, are activated when the piston within the cylinder housing 134 comes in the vicinity of the switches. Switches 144, 146 are electrically connected to the system controller, which controls operation of the cable cylinder 112 by the application of air pressure in a standard fashion.

Referring again to FIGS. 2, 5 and 6, the back dam assembly 34 comprises a back dam 94 extending between opposed corner posts 40 and a pair of air operated cylinders 98 and 100. The back dam 94 is moved between two operating positions by cylinder 98 and is operated in the direction of a loaded pallet by cylinder 100 to apply a force against units to be removed from the pallet. The back dam 94 comprises a substantially flat primary section 105 and a lower section 107 extending outwardly and at an angle to the primary section 105. The angled section is provided to avoid engagement of a lower edge of the back dam 94 with a upwardly moving load or pallet. The inner surface of the back dam, in the area where the sections 105 and 107 join, is the primary surface by which force is exerted on units to be removed from the pallet.

The back dam 94 includes an axle 99 (FIG. 2) extending between opposed corner posts 40 and pivotally mounted to a pair of triangular plates 96. The plates 96 are pivotally mounted to the tower frame 30 through a rod 97 which is mounted to cross members 42 by brackets 101. One of the triangular plates 96 is further pivotally mounted to one end of position cylinder 98 which has another end pivotally mounted to cross member 42 through bracket 102. When the position cylinder 98 retracts, the plates 96 are pivoted so as to move the back dam 94 upwardly to an upper position, as shown in FIG. 2. This is the position of the back dam 94 during the initial unloading phase of a layer of units from a pallet. As explained earlier, the loaded pallet may be lowered for removal of units by means of the collector roller. To position the back dam 94 for proper cooperation with the collector roller 114, the cylinder 98 is extended to move the back dam 94 to a lower position. Force cylinder 100 is pivotally connected to the back dam 94 and to a frontal cross member 42 of the tower frame 30 by a bracket 104. The cylinder 100 moves the back dam 94 in the direction of the metering belt 18 to apply a lateral unloading force to a layer of units 26 on a pallet. The cylinder 100 is retracted to move the back dam 94 away from the interior area of the tower frame 30 to avoid interference with loaded pallet being raised to the unloading position. The back dam is preferably made of a sheet steel material and provided with reinforcing strips 105 (FIG. 6).

One of the two opposed collector roller drives 110 is provided with an electro-optical sensing device 126 disposed along an inner surface. The other of the collector roller drives is provided with a reflective tape. The electro-optical device 126 comprises a light source and a plurality of linearly aligned optical detectors, all of which may be commercially available devices. The light source and the aligned detectors form what is referred to as a light curtain and is connected to the system's controller. When the light curtain is broken at any point, a signal is provided to the controller, indicating the presence of an obstruction in at least some part of the light curtain. A plurality of substantially vertically aligned electro-optical and sensors 128 source and receiving devices are installed on the opposed collector roller drives 110 in the area adjacent the metering belt 18. The electro-optical devices 128 are referred to as a light tree and are electrically connected to the system's controller. The output of the light tree 128 is used by the systems controller to determine presence and movement of units from a pallet and the vertical position of the lower surface of the top layer of a pallet positioned in the area between the collector roller drives 110.

Figure 9:
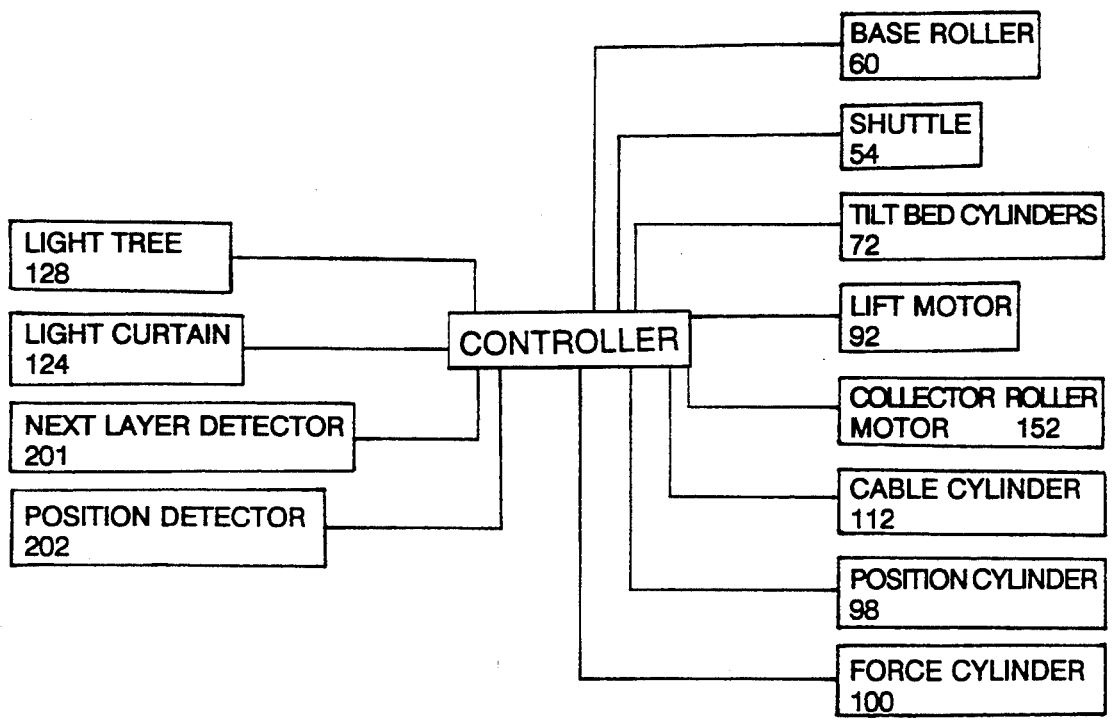
FIG. 9 is a schematic representation showing a control arrangement for controlling the operation of the depalletizer of FIG. 1.
Figure 10:
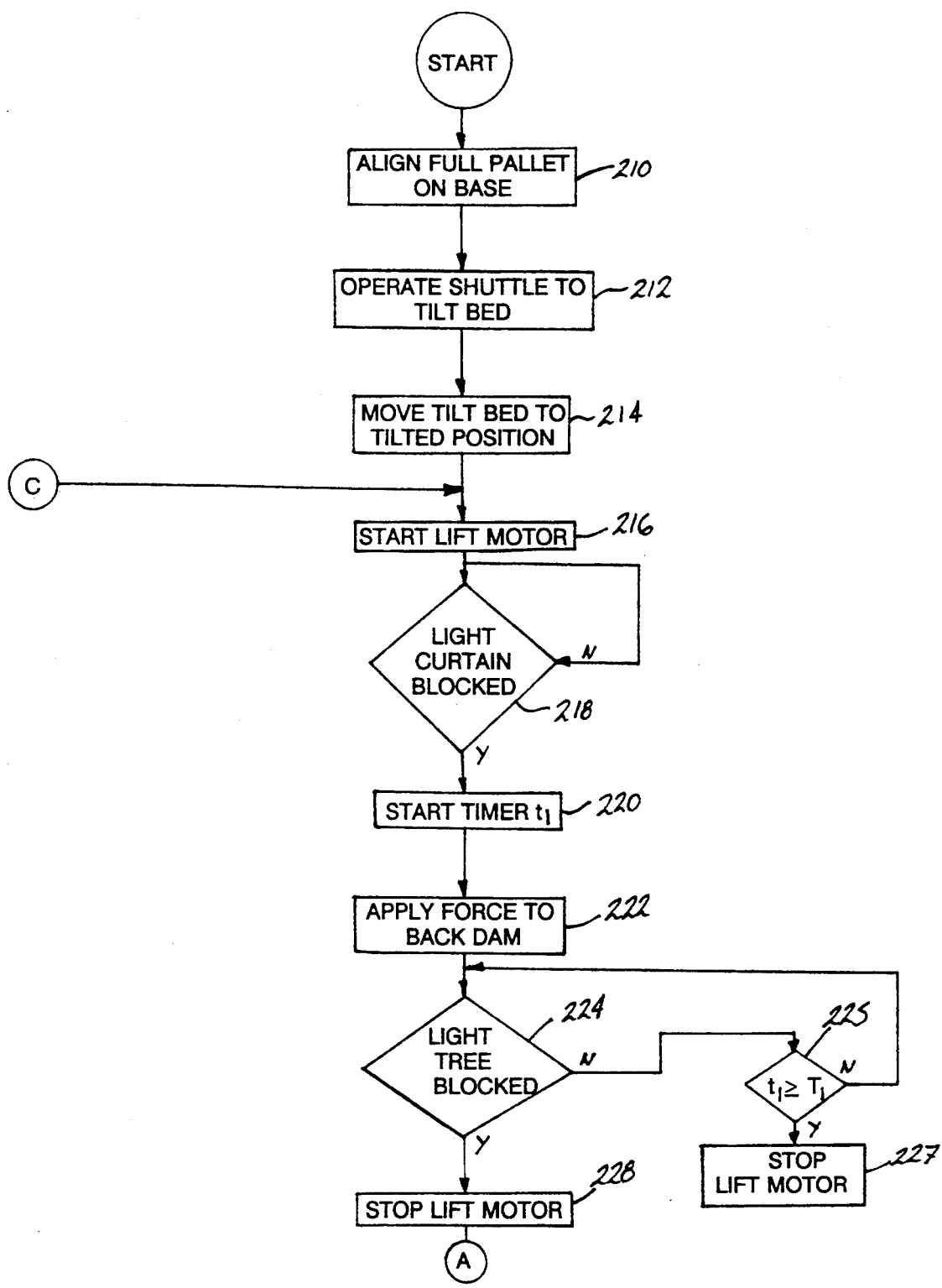
FIGS. 10 through 13 are flow diagram representations of the operation of the depalletizer of the FIG. 1.

FIG. 9 is a block diagram representation of the system controller 200. The various units of the depalletizer 14 are controlled by controller 200 in response to various detectors which form part of the depalletizer 14. In a system such as depicted in FIG. 1, the controller 200 will perform a number of other functions of controlling various conveyors and associated equipment. Such other functions are known in the art and are not described herein. The controller 200 may be any one of a number of well known and commercially programmable controllers.

FIGS. 10-14 form a flow diagram of the functions formed by various components of the depalletizer 14 under control of the controller 200. At the beginning of the operation, a full pallet such as the pallet 24 shown in FIG. 1, is moved onto the base 48 by operation of a conveyor 12. Prior to beginning the depalletizing operation, the tilt bed 50 will have been moved to the upright position and the lifting bed 88 will have been lowered such that the tines 86 are disposed between the rollers 60 of the base. The base rollers 60 are controlled by controller 200 to move the full pallet on the base, in response to signals from an appropriately positioned detector 202, as indicated in block 210 of FIG. 10. A movable alignment stop may be provided at the exit side of the base 48 to aid in aligning the pallet on the base. Next, the shuttle 54 is operated by the controller 200 in the direction of the tilt bed, as indicated in block 212. Thereafter, the tilt bed cylinders 72 are actuated to move the tilt bed to the tilted position as indicated in block 214. The lift motor 92 is then started by the controller 200 as shown in block 216. After the lift motor has been started, the controller 200 checks the light curtain 124 to determine whether any part of the light curtain is blocked, as indicated in decision block 218. As soon as the light curtain is partially blocked, a timer $t_1$, internal to the controller 200 is started, as indicated in block 220. Thereafter, as indicated in block 222, a force is applied against units on the pallet by the back dam by operation of the force cylinder 100, all under control of the controller 200.

In decision block 224 a test is made to determine whether the light tree 128 has been blocked by units sliding from the pallet. If so, the upward movement of the lifting bed 88 is stopped by stopping the lift motor 92, as indicated in block 228. If the test in decision block 224 indicates that the light tree has not been blocked, a test is made of the timer $t_1$ to determine whether it has reached a predetermined time $T_1$, as indicated in decision block 225. The time t1 is calculated such that the topmost layer of the pallet being lifted will not be raised above a specified height. In the event that none of the units slide off the pallet being lifted before time $T_1$, i.e., were not detected by the light tree 128, the lift motor 92 will be stopped, as indicated in block 227. An alarm may be sounded or other appropriate action taken, in that event.

Figure 11:
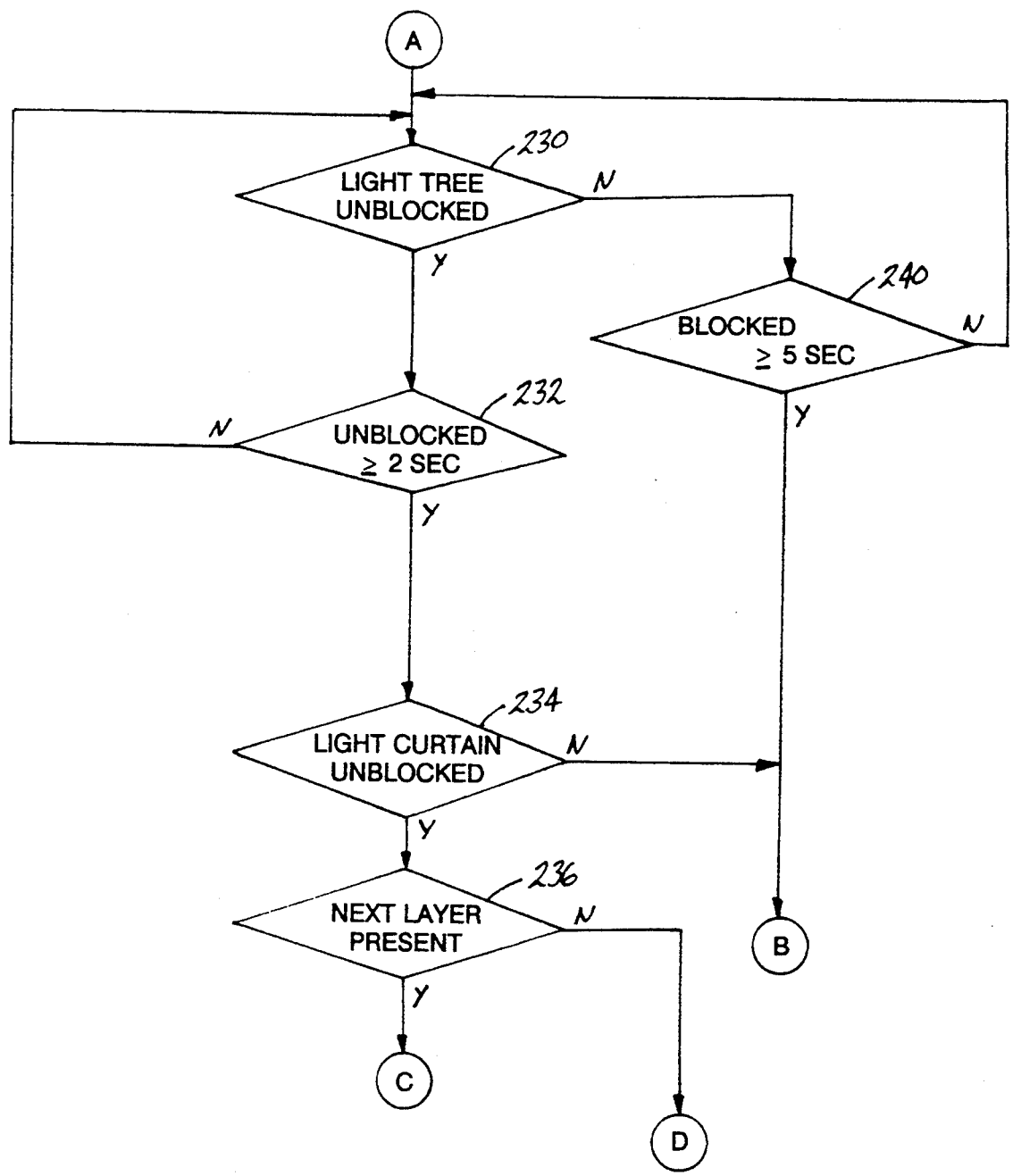

Referring to FIG. 11, in the event that the lift motor was stopped in block 228 after units were detected sliding from the pallet, a test is made in decision block 230 to determine whether the light tree 128 is unblocked. If it is, a further test is made in block 232 to determine whether it has been unblocked for two or more seconds. If not, no further action is taken. If it has been blocked for at least two seconds, a further test is made, as indicated in block 234, to determine whether the light curtain 124 is unblocked. If it is, it indicates that there are no further units remaining in this layer. Thereafter, a further test is made, in block 236, to determine whether there is a next layer present on the pallet. The presence of the next layer may be detected by an optical sensor, next layer detector 201, positioned below the collector roller assembly 36, preferably at the middle of a pallet raised to its highest position. If there is a next layer present, the lift motor will be started, as indicated in block 216 of FIG. 10. Thereafter the sequence in subsequent blocks will be again executed. If it is determined in the test of block 236 that there is not a next layer, as indicated by the next layer detector 201, the pallet will be lowered as described later herein with reference to FIG. 13.

If in the test of block 230 it is determined that the light tree 128 is not unblocked, i.e., is blocked, a test is made in block 240 to determine whether the light tree has been blocked for five or more seconds. If not, no further action is taken. However, if it has been blocked for more than five seconds, it is assumed that a layer has not been completely cleared and a layer clearing sequence, employing the collector roller 114 is initiated as explained later herein with reference to FIG. 12. In the event that the test in block 234 indicates that the light curtain is blocked, after it has been determined in block 232 that the light tree has been unblocked for at least two seconds, the layer clearing operation of FIG. 12 is also initiated.

Figure 12:
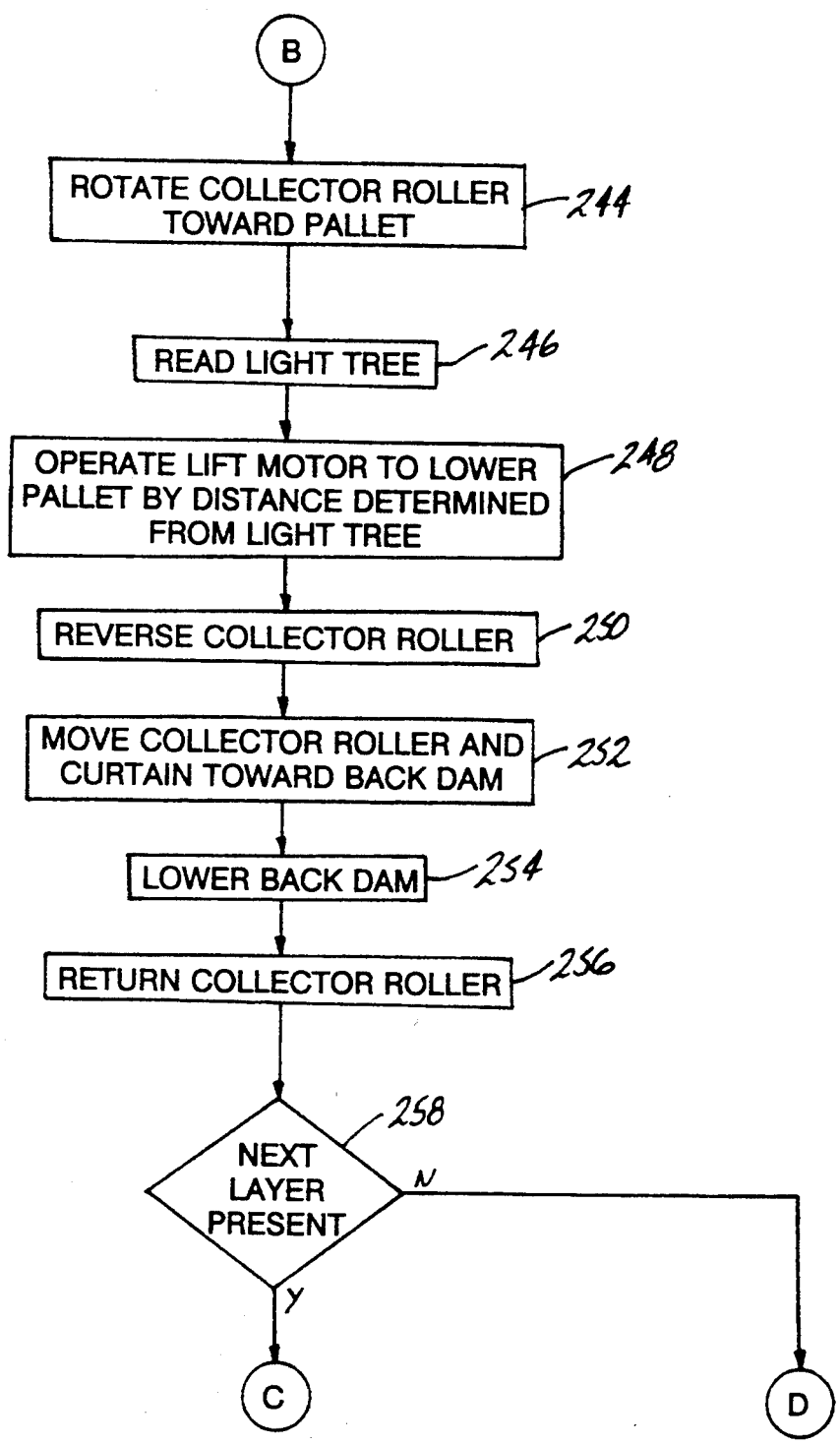

Referring to FIG. 12, the collector roller motor 152 is activated to rotate the collector roller in a direction so as to drive any units partially removed from the pallet onto the pallet as indicated in block 244. Thereafter, the controller 200 reads the light tree 128, in block 246. The light tree, as stated earlier, comprises a number of substantially vertically aligned electro-optical detectors. The detectors are spaced apart by a defined distance and the light tree provides an indication of the position of lower surface of the layer being removed, which is the same as the upper surface of the next layer to be removed. The information as to the position of the upper surface of the next layer is used in controlling the lift motor 92 to lower the pallet such that the upper surface of the next layer is just below the collector roller 114. This operation is indicated in block 248 of FIG. 12. Thereafter, as indicated in block 250, the direction of the rotation of the collector roller 114 is reversed so as to exert an upwardly directed force on any unit with which the roller comes in contact to cause the unit to be lifted up and over the collector roller. As indicated in block 252, the collector roller 114 and the collector apron 160 are moved in the direction of the back dam 94, by operation of a cable cylinder 112 and endless chains 122. The back dam 94 is lowered to its lower position by operation of cylinder 98 for proper engagement with units to be received when the pallet is in the lower position, as indicated in block 254. Any units remaining on the layer will be lifted up and over the collector roller 114 and onto the apron 160 and be allowed to slide onto the metering belt 18. In the event that a unit has a tendency to move with the collector roller, it will be forced against the back dam which will cooperate with the collector roller to force the unit over the collector roller. Thereafter the collector roller is returned to its original position adjacent the metering belt 18, as indicated in block 256. In decision block 258 the next layer detector 201 is checked to determine whether additional layers are to be removed from the pallet. If so, a return is made to block 216 of FIG. 10 and the subsequent sequence is repeated. In the event that it is determined in the test of block 258 that there is not another layer to be removed, an advance is made to FIG. 13 to execute a sequence for returning the empty pallet to the base.

Figure 13:
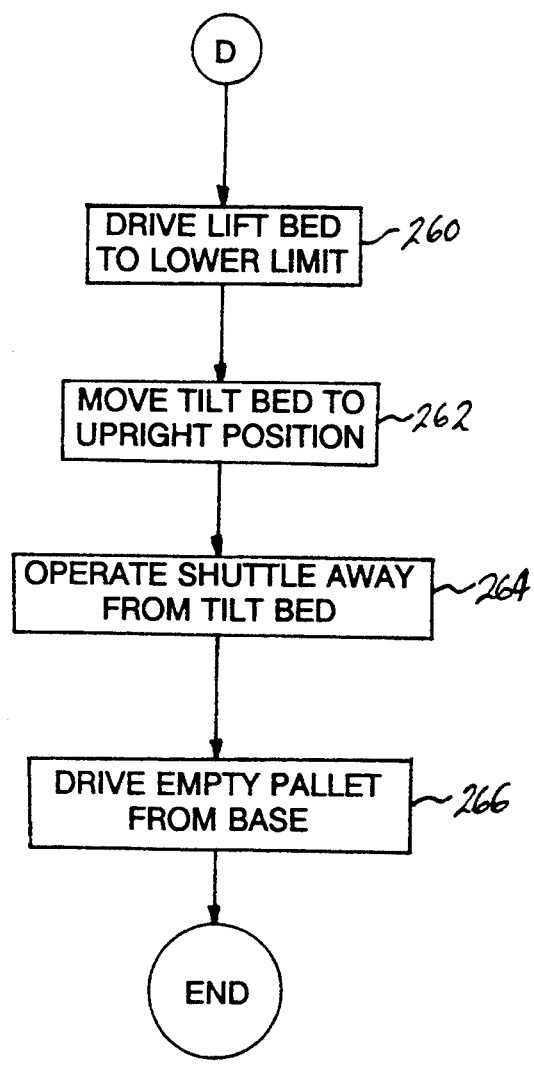

Referring to FIG. 13, block 260 indicates that the lift bed 188 is driven to its lower limit, by operation of the lift motor 92. The tilt bed 50 is brought to its upright position, as indicated in block 262, causing the empty pallet to be deposited on the shuttle 54 of base 48. As indicated in block 264, the shuttle is operated away from the tilt bed 50 to be in alignment with the exit conveyor 22. The base rollers 60 are then activated to drive the pallet onto exit conveyor 22, as indicated in block 266.

It will be understood, that the above described arrangement is merely illustrative in application of the principles of the invention and variations thereof may be devised by those skilled in the art without departing from the spirit and scope of the invention. Particularly, the sequence of performing various operations described herein may be altered without significantly changing the operation of the system.

What is claimed is:

1. A depalletizer in which articles stacked in layers on a pallet are removed from the pallet, the depalletizer comprising:
    an upstanding tower frame defining an inner spacial area, the frame having a loading end and an unloading end and opposed sides;
    a tilt bed having an upper end and a lower end pivotally mounted with respect to the tower frame for tilting movement between a substantially vertical position to a tilted position wherein the upper end is disposed within the inner spacial area of the frame;
    a lift bed mounted to the tilt bed for vertical translation with respect thereto to lift a pallet from a lowered position adjacent the lower end to a pallet unloading position adjacent the upper end of the tilt bed;
    collector roller drives mounted to opposed sides of the frame and extending substantially perpendicularly to the tilt bed when the tilt bed is in the tilted position;
    a cylindrically-shaped collector roller rotatably mounted on a shaft extending between the collector drives;
    the collector roller drives operable to move the shaft from a first position adjacent the unloading end in the direction of the loading end for assisting in the removal of articles from a pallet disposed adjacent the upper end of the tilt bed.

2. The depalletizer according to claim 1 and further comprising a power drive mounted to the collector roller to rotate the collector roller in a direction to drive articles from the pallet to the unloading end.

3. The depalletizer according to claim 2 wherein the power drive for the collector roller is reversible to drive the collector roller also in a direction to drive units further onto the pallet before the collector roller moves from the first position.

4. The depalletizer according to claim 1 wherein the collector roller drives each comprise a chain drive mounting the collector roller therebetween and for moving the collector roller from the first position.

5. The depalletizer according to claim 4 wherein the chain drives have sprockets about which a chain is trained and the chain has a bracket mounting the collector roller.

6. The depalletizer according to claim 5 and further comprising a fluid cylinder for moving the chain of one of the chain drives, the fluid cylinder comprising pulley wheels about which an endless cable is trained and the cable is operably connected to the chain.

7. The depalletizer according to claim 1 and further comprising a sheet of relatively low friction material and having one end operably mounted to the collector roller drives such that the sheet moves with the collector roller when the collector roller is moved from the first position.

8. The depalletizer according to claim 1 and further comprising a back dam mounted to an upper portion of the frame and adjacent the loading end for movement between a first standby position and a second position in which the back dam applies a force in the direction of the unloading end against units positioned on a pallet on the lift bed when the tilt bed is in the tilted position and the lift bed is in the pallet unloading position.

9. The depalletizer according to claim 1 and further comprising a base disposed adjacent the lower end of the tilt bed and a moveable platform movably mounted to the base for supporting a pallet, wherein the platform is arranged to be translated toward and away from the tilt bed.

10. The depalletizer according to claim 9 wherein the moveable platform has a frame which mounts powered rollers for moving the pallets onto and off of the base.

11. The depalletizer according to claim 10 wherein the lift bed has multiple, spaced apart tines for supporting a pallet and the base has slotted openings between the powered rollers and wherein the tines are disposed in the slotted openings when the lift bed is in the lowered position.

12. The depalletizer according to claim 1 and further comprising a power drive to move the lift bed between the lowered position and the unloading position, the power drive comprising a rack and pinion drive having a rack mounted on one of the lift bed and the tilt bed and a pinion gear mounted on the other of the lift bed and the tilt bed and powered by an electric motor.

13. Depalletizer apparatus for removing articles from a pallet, the apparatus comprising:
    an upstanding tower frame defining an inner spacial area, the frame having a loading end and an unloading end and opposed sides;
    a loading conveyer extending along the loading end for moving a pallet to be unloaded along a path extending in a conveying direction;
    a tilt bed having an upper end and a lower end pivotally mounted with respect to the tower frame for tilting movement between a substantially vertical position to a tilted position wherein the upper end is disposed within the inner spacial area of the frame;

a lift bed mounted to the tilt bed for vertical translation with respect thereto to lift a pallet from a lowered position adjacent the lower end to a pallet unloading position adjacent the upper end of the tilt bed; and a base disposed adjacent the lower end of the tilt bed and a moveable platform movably mounted to the base for supporting a pallet, wherein the platform is arranged to be translated toward and away from the tilt bed along a path extending in a direction perpendicular to the conveying direction.

14. Depalletizer apparatus according to claim 13 wherein the moveable platform has a frame which mounts powered rollers for moving pallets onto and off of the base.

15. The depalletizer according to claim 14 wherein the lift bed has multiple, spaced apart tines for supporting a pallet and the base has slotted openings between the powered rollers and wherein the tines are disposed in the slotted openings when the lift bed is in the lowered position.

16. Depalletizer apparatus for removing articles from a pallet, the apparatus comprising:

an upstanding frame defining an inner spacial area, the frame having a loading end and an unloading end and opposed sides;

a tilt bed having an upper end and a lower end pivotally mounted with respect to the tower frame for tilting movement between a substantially vertical position to a tilted position wherein the upper end is disposed within the inner spacial area of the frame;

a lift bed mounted to the tilt bed for vertical translation with respect thereto to lift a pallet from a lowered position adjacent the lower end to a pallet unloading position adjacent the upper end of the tilt bed; and a back dam movably mounted to an upper portion of the frame and adjacent the loading end for movement between a retracted position and a position in which the back dam applies a force in the direction of the unloading end against units positioned on a pallet on the lift bed when the tilt bed is in the tilted position and the lift bed is in the pallet unloading position.

17. Depalletizer apparatus according to claim 16 wherein the lift bed is operative to selectively position a pallet of an upper or a lower pallet unloading position and the back dam is selectively movable between an upper and a lower forcing position for applying a force against units positioned on a pallet in the upper or the lower pallet unloading positions.

18. Depalletizer apparatus according to claim 17 and further comprising a plate mounted to the back dam and pivotally mounted to the tower frame and a positioning cylinder having one end mounted to the tower frame and another end pivotally mounted to the plate, the positioning cylinder operative to pivot the plate to move the back dam between the upper and lower forcing positions.

19. A pallet unloader according to claim 18 and further comprising a force application cylinder having one end mounted to the frame and another end mounted to the back dam and operative to exert a force on the back dam in the direction of the unloading end of the frame.

20. A method of unloading articles stacked on a pallet, in a plurality of layers, from the pallet, the method comprising the steps of:

placing a loaded pallet adjacent to a tilt bed;

tilting the tilt bed to a predetermined angle;

raising the pallet such that a lower surface of one layer is at a level at least equal the level of a discharge conveyer;

moving a collector roller along the lower surface of the one layer and removing articles from the one layer by means of the collector roller.

21. The method in accordance with claim 20 and further comprising the step of detecting presence of articles in the one layer and moving the collector roller along the lower surface of the one layer only if the presence of an article in the one layer is detected.

22. The method in accordance with claim 20 wherein the collector roller is arranged to travel in a plane substantially parallel to the plane of the lower surface of the one layer, the method further comprising the steps of detecting the distance between the plane of the lower surface and the plane of the collector roller and the step of lowering the pallet a distance corresponding to the detected distance.

23. The method in accordance with claim 22 and further comprising the step of rotating the collector roller in a predetermined direction so as to drive articles in the direction of the discharge conveyer.

24. The method in accordance with claim 23 and further comprising the step of driving the collector roller in a direction opposite to the predetermined direction to drive articles away from the discharge conveyer prior to driving the collector roller in the predetermined direction.

25. The method in accordance with claim 20 and further comprising a step of detecting the movement of articles from the one layer to the exit conveyer and stopping the lifting of the pallet when movement of an article from the pallet to the exit conveyer is detected.

26. The method in accordance with claim 20 and further comprising a step of applying a force against articles of the one layer in the direction of the exit conveyer by means of a movable back dam.

* * * * *

UNITED STATES PATENT AND TRADEMARK OFFICE
CERTIFICATE OF CORRECTION

PATENT NO. : 5,451,136

DATED : September 19, 1995

INVENTOR(S) : Richard L. Easton

It is certified that error appears in the above-indentified patent and that said Letters Patent is hereby corrected as shown below:

```
Col. 11, claim 17, line 50:
     after "pallet" delete "of" and insert --in--.
```

Signed and Sealed this

Fourth Day of June, 1996

Attest:

BRUCE LEHMAN

*Attesting Officer*           *Commissioner of Patents and Trademarks*